United States Patent
Chung et al.

(10) Patent No.: US 11,365,911 B2
(45) Date of Patent: Jun. 21, 2022

(54) GAS HEAT PUMP SYSTEM

(71) Applicant: LG ELECTRONICS INC., Seoul (KR)

(72) Inventors: Minho Chung, Seoul (KR); Kwangho Shin, Seoul (KR); Kijung Ryu, Seoul (KR); Song Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 16/760,914

(22) PCT Filed: Nov. 13, 2018

(86) PCT No.: PCT/KR2018/013834
§ 371 (c)(1),
(2) Date: May 1, 2020

(87) PCT Pub. No.: WO2019/093867
PCT Pub. Date: May 16, 2019

(65) Prior Publication Data
US 2021/0180841 A1   Jun. 17, 2021

(30) Foreign Application Priority Data
Nov. 13, 2017   (KR) .................. 10-2017-0150737

(51) Int. Cl.
*F25B 30/02*   (2006.01)
*F02B 37/04*   (2006.01)
(Continued)

(52) U.S. Cl.
CPC .............. *F25B 30/02* (2013.01); *F01P 5/10* (2013.01); *F02B 37/04* (2013.01); *F02B 39/10* (2013.01); *F02D 41/0007* (2013.01)

(58) Field of Classification Search
CPC .......... F25B 30/02; F02B 37/04; F02B 39/10; F02B 37/004; F02B 37/013; F01P 5/10
See application file for complete search history.

(56) References Cited

U.S. PATENT DOCUMENTS 6,226,981 B1 * 5/2001 Bruch ................ F02M 21/0215
60/274
2011/0296828 A1 * 12/2011 An ........................ F02B 37/007
60/600

(Continued)

FOREIGN PATENT DOCUMENTS

DE   10-2006-024420   12/2006
EP   3150938          4/2017

(Continued)

OTHER PUBLICATIONS

Machine translation of description of JP 2004085091 A obtained from epo.org.*

(Continued)

*Primary Examiner* — Ngoc T Nguyen
(74) *Attorney, Agent, or Firm* — Ked & Associates, LLP

(57) ABSTRACT

A gas heat pump system is disclosed. The gas heat pump system includes an air conditioning module including a compressor, an outdoor heat exchanger, an expansion device, an indoor heat exchanger and a refrigerant pipe, an engine module including an engine configured to burn a mixture of fuel and air and provide power for operation of the compressor, a cooling module including a cooling water pump configured to generate flow of cooling water for cooling the engine and a cooling water pipe connected to the cooling water pump to guide flow of cooling water. The engine module includes a mixer configured to discharge the mixture of air and fuel to the engine, a supercharger disposed between the mixer and the engine to compress the mixture discharged from the mixer and discharge the mixture to the (Continued)

engine, and an adjuster disposed between the supercharger and the engine to adjust an amount of compressed mixture supplied to the engine.

16 Claims, 7 Drawing Sheets

(51) Int. Cl.
*F02B 39/10* (2006.01)
*F01P 5/10* (2006.01)
*F02D 41/00* (2006.01)

(56) References Cited

U.S. PATENT DOCUMENTS

| | | | |
|---|---|---|---|
| 2013/0209291 A1* | 8/2013 | Kitsukawa | F02B 39/10 417/410.1 |
| 2013/0269341 A1* | 10/2013 | Kurata | F02B 37/013 60/605.2 |
| 2016/0208679 A1 | 7/2016 | Gebhardt | |

FOREIGN PATENT DOCUMENTS

| | | |
|---|---|---|
| JP | H01-313615 | 12/1989 |
| JP | 06-272593 | 9/1994 |
| JP | 11-14186 | 1/1999 |
| JP | 2004-085091 | 3/2004 |
| JP | 4066742 | 3/2008 |
| JP | 2016-164399 | 9/2016 |
| KR | 10-1341533 | 1/2014 |
| KR | 10-2015-0048403 | 5/2015 |

OTHER PUBLICATIONS

European Search Report dated Jul. 2, 2021 issued in Application No. 18876066.4.
International Search Report (with English Translation) dated Feb. 20, 2019 issued in Application No. PCT/KR2018/013834.

* cited by examiner

GAS HEAT PUMP SYSTEM

CROSS-REFERENCE TO RELATED PATENT APPLICATIONS

This application is a U.S. National Stage Application under 35 U.S.C. § 371 of PCT Application No. PCT/KR2018/013834, filed Nov. 13, 2018, which claims priority to Korean Patent Application No. 10-2017-0150737, filed Nov. 13, 2017, whose entire disclosures are hereby incorporated by reference.

TECHNICAL FIELD

The present disclosure relate to a gas heat pump system.

BACKGROUND ART

A heat pump system includes a refrigeration cycle capable of performing cooling or heating operation and may be interlocked with a hot water supply device or an air conditioning and heating device. That is, hot water may be generated or air conditioning for cooling or heating may be performed using a heat source obtained by heat exchange between refrigerant of a refrigeration cycle and a predetermined heat storage medium.

The refrigeration cycle includes a compressor for compressing refrigerant, a condenser for condensing the refrigerant compressed in the compressor, an expansion device for decompressing the refrigerant condensed in the condenser and an evaporator for evaporating the decompressed refrigerant.

The heat pump system includes a gas heat pump system. A large-capacity compressor is required for air conditioning in industrial or large building, not for home use. That is, as a system which uses a gas engine instead of an electric motor to drive a compressor for compressing a large amount of refrigerant into high-temperature, high-pressure gas, a gas heat pump system may be used.

The gas heat pump system includes an engine for generating power using a mixture of fuel and air (hereinafter referred to as a mixture). For example, the engine may include a cylinder, to which the mixture is supplied, and a piston movably provided in the cylinder.

The gas heat pump system includes an air supply device for supplying the mixture to the engine, a fuel supply device and a mixer for mixing air and fuel.

The air supply device may include an air filter for purifying air. The fuel supply device includes a zero governor for supplying fuel having constant pressure.

The zero governor may be understood as a device for constantly adjusting outlet pressure regardless of the magnitude of the inlet pressure of fuel or change in flow rate of fuel for supplying fuel. For example, the zero governor may include a nozzle unit for reducing the pressure of the fuel, a diaphragm, to which the pressure reduced in the nozzle unit is applied, and a valve device opened and closed by operation of the diaphragm.

Air which has passed through the air filter and the fuel discharged from the zero governor may be mixed in the mixer (to form mixture) and the mixture may be supplied to the engine.

In addition, when the mixture supplied to the engine is burned, exhaust gas may be discharged from the engine. The gas heat pump system further includes a muffler for reducing noise generated in the exhaust gas.

A conventional gas heat pump system is as follows.
1. Registration No. (Registration date): 10-1341533 (Dec. 9, 2013)
Title of the Invention 2: Gas heat pump system and method of controlling the same The conventional gas heat pump circulates compressor refrigerant using a gas engine using liquefied natural gas (LNG) or liquefied petroleum gas (LPG) for household as a hat source and operates in a cooling mode in the summer and operates in a heating mode in the winter.

However, when air is supplied to the gas engine using a natural aspiration method and LNG or LPG for household is supplied as fuel, output of the gas engine is reduced due to low supply pressure (1 to 2.5 kPa).

In addition, in the summer, the gas heat pump system operates in the cooling mode in order to decrease an indoor temperature. When an outdoor temperature is high, high-temperature gas is supplied to the gas engine due to the high temperature.

Therefore, low-density air is supplied to the gas engine, thereby decreasing output of the gas engine. As a result, the output of the gas engine cannot keep up with a high cooling load, thereby causing cooling failure.

In addition, in order to solve this, as in the engine of a vehicle, after air is pressurized in a supercharger, when the amount of fuel is adjusted according to the amount of air, the supply pressure (about 2.5 kPa) of the gas fuel in the pipe is lower than supercharging pressure (about 30 kPa). Therefore, it is difficult to supply fuel.

INVENTION

Technical Problem

An object of the present disclosure devised to solve the problem lies in a gas heat pump system capable of improving performance of an engine by supercharging a mixture supplied to the engine.

Another object of embodiments is to provide a gas heat pump system capable of improving maximum output of an engine without increasing the size of the engine.

Another object of embodiments is to provide a gas heat pump system capable of improving volumetric efficiency of an engine by decreasing the temperature of a mixture supplied to the engine and increasing the density of the mixture.

Another object of embodiments is to provide a gas heat pump system capable of preventing safety accidents such as corrosion and explosion of parts by driving an engine until the engine is stopped while blocking inflow of a mixture and burning or discharging a residual mixture to suppress generation of formic acid.

Another object of embodiments is to provide a gas heat pump system capable of smoothly supercharging a mixture regardless of a rotation speed, by supercharging the mixture through a turbocharger in a high-rotation operation region and supercharging the mixture through a supercharger in a low-rotation operation region.

Another object of embodiments is to provide a gas heat pump system capable of supercharging in a wider region by providing a plurality of turbochargers having different turbine capacities.

Technical Solution

According to an aspect of embodiments, a gas heat pump system includes an air conditioning module including a compressor, an outdoor heat exchanger, an expansion device, an indoor heat exchanger and a refrigerant pipe, an engine module including an engine configured to burn a mixture of fuel and air and provide power for operation of the compressor, and a cooling module including a cooling water pump configured to generate flow of cooling water for cooling the engine and a cooling water pipe connected to the cooling water pump to guide flow of cooling water. The engine module includes a mixer configured to discharge the mixture of air and fuel to the engine, a supercharger disposed between the mixer and the engine to compress the mixture discharged from the mixer and discharge the mixture to the engine, and an adjuster disposed between the supercharger and the engine to adjust an amount of compressed mixture supplied to the engine.

An intercooler configured to cool the compressed mixture discharged from the supercharger to improve density may be provided between the supercharger and the adjuster.

The supercharger may be provided as a turbocharger driven by exhaust gas of the engine.

The supercharger may be provided as a supercharger driven by power of the engine or an electric motor.

The cooling water pipe may include a first cooling water pipe configured to guide the cooling water discharged from the cooling water pump to the engine, and a second cooling water pipe branched from the first cooling water pipe and passing through the supercharger, such that heat is exchanged between at least some cooling water and the supercharger.

An exhaust gas heat exchanger, into which exhaust gas discharged from the engine flows, may be provided on the first cooling water pipe, and the cooling water may flow to the engine after passing through the exhaust gas heat exchanger.

The second cooling water pipe may be branched from the first cooling water pipe before the supercharger and combined with the first cooling water pipe after passing through the supercharger.

The supercharger may include a first supercharger and a second supercharger spaced apart from each other.

The first supercharger and the second supercharger may be different in view of compression capacity or maximum turbine revolution count of a turbine.

The first supercharger and the second supercharger may be connected to each other in series.

The first supercharger and the second supercharger may be connected to each other in parallel.

The gas heat pump system may further include a first fuel pipe provided between the mixer and the first supercharger to guide the mixture obtained in the mixer to the first supercharger, a second fuel pipe branched from the first fuel pipe to guide the mixture to the second supercharger, and a three-way valve installed at an intersection between the first fuel pipe and the second fuel pipe to maintain a flow direction of the mixture discharged from the mixer to the first fuel pipe or change the flow direction to the second fuel pipe.

The first supercharger may be a turbocharger driven by exhaust gas of the engine and the second supercharger may be a supercharger driven by power of the engine or an electric motor.

The first supercharger and the second supercharger may be turbochargers driven by exhaust gas of the engine.

The gas heat pump system may further include a first exhaust gas pipe provided between the engine and the second supercharger to guide exhaust gas discharged from the engine to the first supercharger, a second exhaust gas pipe branched from the first exhaust gas pipe to guide exhaust gas to the second supercharger, and a three-way valve installed at an intersection between the first exhaust gas pipe and the second exhaust gas pipe to maintain a flow direction of the exhaust gas discharged from the engine to the first exhaust gas pipe or change the flow direction to the second exhaust gas pipe.

The fuel may be liquefied natural gas (LNG) or liquefied petroleum gas (LPG) for household.

The engine module may operate the engine in a state of closing the adjuster, immediately before operation of the engine is stopped.

Effect of the Invention

According to the present disclosure, it is possible to improve volumetric efficiency, by supplying, to an engine, a mixture of fuel and air supplied to a gas engine with pressure higher than natural aspiration using a supercharging unit.

In addition, it is possible to miniaturize the engine and the entire system.

In addition, it is possible to implement a high-capacity gas engine heat pump system with a small gas engine.

In addition, it is possible to improve output of an engine in a gas engine heat pump (GHP) using gas fuel for household.

In addition, it is possible to improve volumetric efficiency of the engine by decreasing the temperature of a mixture supplied to an engine and increasing the density of the mixture.

In addition, it is possible to prevent safety accidents such as corrosion and explosion of parts by driving an engine until the engine is stopped while blocking inflow of a mixture and burning or discharging a residual mixture to suppress generation of formic acid.

In addition, it is possible to smoothly supercharge a mixture regardless of a rotation speed, by supercharging the mixture through a turbocharger in a high-rotation operation region and supercharging the mixture through a supercharger in a low-rotation operation region.

MODE

Hereinafter, specific embodiments of the present disclosure will be described with reference to the drawings. However, the spirit of the present disclosure is not limited to the embodiments, and those skilled in the art who understand the spirit of the present disclosure may easily propose other embodiments within the scope of the same spirit.

Figure 1:
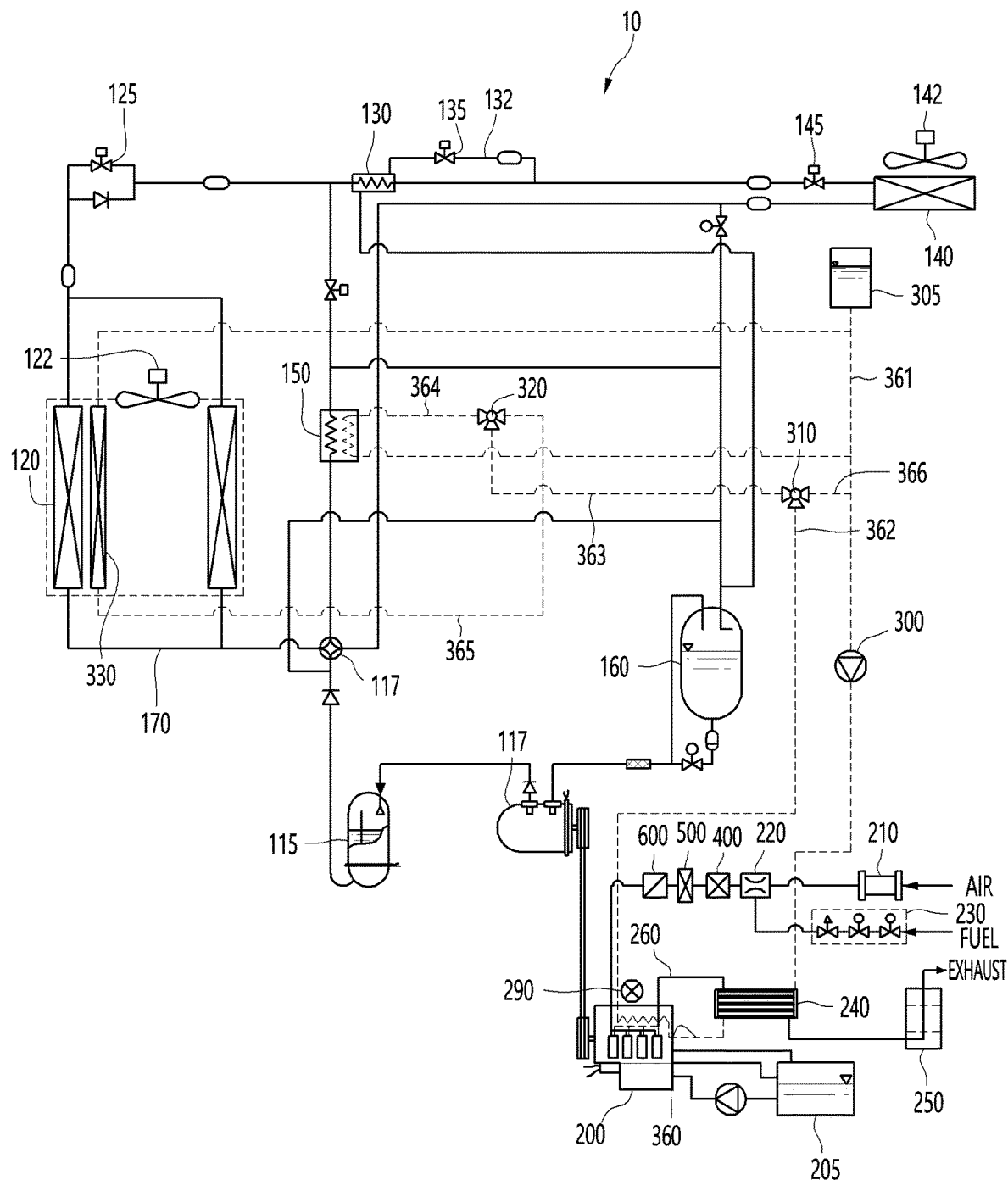
FIG. 1 is a cycle diagram showing the configuration of a gas heat pump system according to a first embodiment of the present disclosure.

FIG. 1 is a cycle diagram showing the configuration of a gas heat pump system according to a first embodiment of the present disclosure.

Referring to FIG. 1, the gas heat pump system 10 according to the first embodiment of the present disclosure includes a plurality of parts configuring a refrigerant cycle as an air conditioning system. Specifically, the refrigerant cycle includes a compressor 110 for compressing refrigerant, an oil separator 115 for separating oil from the refrigerant compressed in the compressor 110 and a four-way valve 117 for changing the direction of the refrigerant which has passed through the oil separator 115.

The gas heat pump system 10 further includes an outdoor heat exchanger 120 and an indoor heat exchanger 140. The outdoor heat exchanger 120 may be disposed in an outdoor unit disposed outdoors and the indoor heat exchanger 140 may be disposed in an indoor unit disposed indoors. The refrigerant which has passed through the four-way valve 117 flows to the outdoor heat exchanger 120 or the indoor heat exchanger 140.

Meanwhile, the components of the system shown in FIG. 1 except for the indoor heat exchanger 140 and an indoor expansion device 145 may be disposed outdoors, that is, in the outdoor unit.

Specifically, when the system 10 operates in a cooling operation mode, the refrigerant which has passed through the four-way valve 117 flows to the indoor heat exchanger 140 through the outdoor heat exchanger 120. In contrast, when the system 10 operates in a heating operation mode, the refrigerant which has passed through the four-way valve 117 flows to the outdoor heat exchanger 120 through the indoor heat exchanger 140.

The system 10 includes further includes a refrigerant pipe 170 (solid flow path) for guiding the flow of the refrigerant by connecting the compressor 110, the outdoor heat exchanger 120 and the indoor heat exchanger 140.

The configuration of the system 10 will be described based on the cooling operation mode.

The refrigerant flowing to the outdoor heat exchanger 120 may be condensed through heat exchange with outdoor air. An outdoor fan 122 for blowing outdoor air is included at one side of the outdoor heat exchanger 120.

A main expansion device 125 for decompressing refrigerant is provided at the outlet side of the outdoor heat exchanger 120. For example, the main expansion device 125 includes an electronic expansion valve (EEV). During the cooling operation, the main expansion device 125 is fully open not to perform the decompression operation of the refrigerant.

A supercooling heat exchanger 130 for further cooling the refrigerant is provided at the outlet side of the main expansion device 125. In addition, the supercooling heat exchanger 130 is connected with a supercooling flow path 132. The supercooling flow path 132 is branched from the refrigerant pipe 170 and is connected to the supercooling heat exchanger 130.

In addition, a supercooling expansion device 135 is installed in the supercooling flow path 132. The refrigerant flowing through the supercooling flow path 132 may be decompressed while passing through the supercooling expansion device 135.

In the supercooling heat exchanger 130, heat exchange may be performed between the refrigerant in the refrigerant pipe 170 and the refrigerant in the supercooling flow path 132. In the heat exchange process, the refrigerant in the refrigerant pipe 170 is supercooled, and the refrigerant in the supercooling flow path 132 absorbs heat.

The supercooling flow path 132 is connected to a gas-liquid separator 160. The refrigerant in the supercooling flow path 132 which has exchanged heat in the supercooling heat exchanger 130 may flow into the gas-liquid separator 160.

The refrigerant in the refrigerant pipe 170, which has passed through the supercooling heat exchanger 130, flows to the indoor unit and is decompressed in the indoor expansion device 145 and then is evaporated in the indoor heat exchanger 140. The indoor expansion device 145 is installed inside the indoor unit and may be composed of an electronic expansion valve (EEV).

The refrigerant evaporated in the indoor heat exchanger 140 flows to an auxiliary heat exchanger 150 through the four-way valve 117. The auxiliary heat exchanger 150 refers to a heat exchanger capable of exchanging heat between the evaporated low-pressure refrigerant and high-temperature cooling water and may include a plate type heat exchanger.

The refrigerant evaporated in the indoor heat exchanger 140 may absorb heat while passing through the auxiliary heat exchanger 150, thereby improving evaporation efficiency. In addition, the refrigerant which has passed through the auxiliary heat exchanger 150 may flow into the gas-liquid separator 160.

The refrigerant which has passed through the auxiliary heat exchanger 150 is separated into gas and liquid in the gas-liquid separator 160, and the separated gaseous refrigerant may be sucked into the compressor 110.

In addition, the refrigerant evaporated in the indoor heat exchanger 140 may immediately flow into the gas-liquid separator 160 through the four-way valve 117, and the separated gaseous refrigerant may be sucked into the compressor 110.

Meanwhile, the gas heat pump system 10 further includes a cooling water tank 305 in which cooling water for cooling an engine 200 is stored and a cooling water pipe 360 (dotted flow path) for guiding the flow of cooling water. In the cooling pipe 360, a cooling water pump 300 for generating the flow force of the cooling water, a plurality of flow switching units 310 and 320 for changing the flow direction of the cooling water, and a radiator 330 for cooling the cooling water.

The plurality of flow changing units 310 and 320 includes a first flow charging unit 310 and a second flow changing unit 320. For example, the first flow changing unit 310 and the second flow changing unit 320 may include 3-way valves.

The radiator 330 may be installed at one side of the outdoor heat exchanger 120, and the cooling water of the radiator 330 may exchange heat with outdoor air by driving of the outdoor fan 122. In this process, cooling may be performed.

When the cooling water pump 300 is driven, the cooling water stored in the cooling water tank 305 may pass through the engine 200 and an exhaust gas heat exchanger 240, and selectively flow to the radiator 330 or the auxiliary heat exchanger 150 through the first flow changing unit 310 and the second flow changing unit 320.

The gas heat pump system 10 includes the engine 200 for generating power for driving the compressor 110 and a mixer 220 disposed at the inlet side of the engine 200 to supply mixed fuel.

In addition, the gas heat pump system 10 includes an air filter 210 for supplying purified air to the mixer 220 and a zero governor 230 for supplying fuel having a predetermined pressure or less. The zero governor may be understood as a device for constantly adjusting outlet pressure regardless of the magnitude of the inlet pressure of fuel or change in flow rate of fuel and supplying fuel.

Air which has passed the air filter 210 and fuel discharged from the zero governor 230 may be mixed in the mixer 220 to configure a mixture. In addition, the mixture may be supplied to the engine 200.

In addition, the gas heat pump system 10 further includes an exhaust gas heat exchanger 240 provided at the outlet side of the engine 200 to receive exhaust gas generated after the mixture is burned and a muffler 250 provided at the outlet side of the exhaust gas heat exchanger 240 to reduce noise of exhaust gas. In the exhaust gas heat exchanger 240, heat is exchanged between cooling water and exhaust gas.

In addition, an oil tank 205 for supplying oil to the engine 200 may be provided at one side of the engine 200.

Meanwhile, the engine 200 applied to the gas heat pump system 10 uses LNG or LPG for household as fuel.

However, when LNG or LPG for household is supplied as fuel while supplying air to the engine 200 using a natural aspiration method, the output of the engine 200 may be reduced due to low supply pressure (1 to 2.5 kPa).

In addition, in the summer, the gas heat pump system 10 operates in the cooling mode in order to reduce the indoor temperature. When the outdoor temperature is high, high-temperature air is supplied to the engine 200 due to the high temperature.

Therefore, low-density air is supplied to the engine 200 to reduce the output of the engine 200. As a result, the output of the engine 200 cannot keep up with a high cooling load, thereby causing cooling failure.

In addition, in order to solve this, as in the engine of a vehicle, after air is pressurized in a supercharger, when the amount of fuel is controlled according to the amount of air, the supply pressure (about 2.5 kPa) of the gas fuel in the pipe is lower than supercharging pressure (about 30 kPa). Therefore, it is difficult to supply fuel.

In the present disclosure, in order to solve this problem, a supercharging unit 400 and an adjustment unit 600 are provided between the mixer 220 and the engine 200.

Specifically, the supercharging unit 400 compresses the mixture discharged after air and fuel are mixed in the mixer 220 and discharge the mixture to the engine 200. At this time, the supercharging unit 400 may compress air and fuel mixed in the mixer 220 to atmospheric pressure or more.

For example, the supercharging unit 400 is provided as a turbocharger driven by the exhaust gas of the engine 200.

As another example, the supercharging unit 400 may be provided as a supercharger driven by power of the engine 200 or an electric motor.

In addition, the adjusting unit 600 is disposed between the supercharging unit 400 and the engine 200 to adjust the amount of compressed mixture supplied to the engine 200.

For example, the adjusting unit 600 may be provided as a valve to which an ETC (electronic throttle control) method is applied.

According to the present disclosure, fuel and air may be mixed in the mixer 220, be compressed to high pressure in the supercharging unit 400, and be supplied to the engine 200. In addition, the amount of mixture (air+fuel) supplied to the engine 200 through the adjusting unit 600 may be precisely controlled.

Accordingly, efficiency of the engine 200 may be improved. In addition, it is possible to increase the maximum output of the engine 200, without increasing the size of the engine 200. That is, the output of a large engine may be implemented by a small engine.

Meanwhile, as described above, when the mixture passes through the supercharging unit 400, the pressure and temperature of the mixture increase. In this case, the density of the mixture sucked into the engine 200 may be reduced and the volumetric efficiency of the engine may be reduced.

In the present disclosure, in order to solve this, an intercooler 500 for cooling the high-temperature, high-pressure mixture discharged from the supercharging unit 400 to reduce the volume and density of the mixture and then discharging the mixture is provided between the supercharging unit 400 and the adjusting unit 600.

For example, the intercooler 500 may enable heat exchange between outdoor air or cooling water and the mixture.

Therefore, it is possible to decrease the temperature of the mixture supplied to the engine 200 and increase the density of the mixture to improve the volumetric efficiency of the engine 200.

Meanwhile, as described above, when the supercharging unit 400 and the intercooler 500 are provided between the mixer 220 and the engine 200, the length of the flow path in which the mixture stays may inevitably increase. At this time, when a lot of moisture is included in air, the mixture and water react to generate formic acid, such that the pipe may be damaged and exploded.

In the present disclosure, in order to prevent this problem, when an administrator inputs an "operation stop command", the engine 200 may be driven in a state of closing the adjusting unit 600 until the engine 200 is stopped, thereby burning or discharging the mixture. Therefore, it is possible to suppress generation of formic acid and prevent damage to and explosion of the pipe.

In addition, the intercooler 500 may be made of a corrosion-resistant material (e.g., STS316).

Meanwhile, the cooling pipe 360 includes a first pipe 361 extending from the cooling water tank 305 to the engine 200. Specifically, the first pipe 361 includes a first pipe part extending from the cooling water tank 305 to the exhaust gas heat exchanger 240 and a second pipe part extending from the exhaust gas heat exchanger 240 to the engine 200. Accordingly, cooling water supplied from the cooling water tank 305 exchanges heat with exhaust gas while passing through the exhaust gas heat exchanger 240, and flows into the engine 200 to recover waste heat of the engine 200. In addition, the first pipe 361 may be provided with the cooling water pump 300 for generating flow of cooling water.

The cooling pipe 360 further includes a second pipe 362 for guiding cooling water which has passed through the engine 200 to the first flow changing unit 310.

In addition, the cooling pipe 360 further includes a third pipe 363 for guiding cooling water from the first flow changing unit 310 to the second flow changing unit 320.

In addition, the cooling pipe 360 further includes a fourth pipe 364 for guiding cooling water from the second flow changing unit 320 to the auxiliary heat exchanger 150.

The cooling pipe 360 further includes a fifth pipe 365 for guiding cooling water from the second flow changing unit 320 to the radiator 150.

The cooling pipe 360 further includes a sixth pipe 366 for guiding cooling water from the first flow changing unit 310 to the first pipe 361.

For example, when the temperature of the cooling water which has passed the engine 200 is less than a set temperature, the cooling water may flow to the auxiliary heat exchanger 150 or the radiator 330, thereby reducing heat exchange effect. Therefore, the cooling water flowing into the first flow changing unit 310 may be bypassed to the first pipe 361 through the sixth pipe 366. The sixth pipe 366 may be referred to as a "bypass pipe".

The gas heat pump system 10 may further include a cooling water temperature sensor 290 installed at the outlet side of the engine 200 to detect the temperature of the cooling water which has passed the engine 200.

Hereinafter, operation of the refrigerant, cooling water and mixed fuel according to the operation mode of the gas heat pump system 10 according to the first embodiment of the present disclosure will be described.

Figure 2:
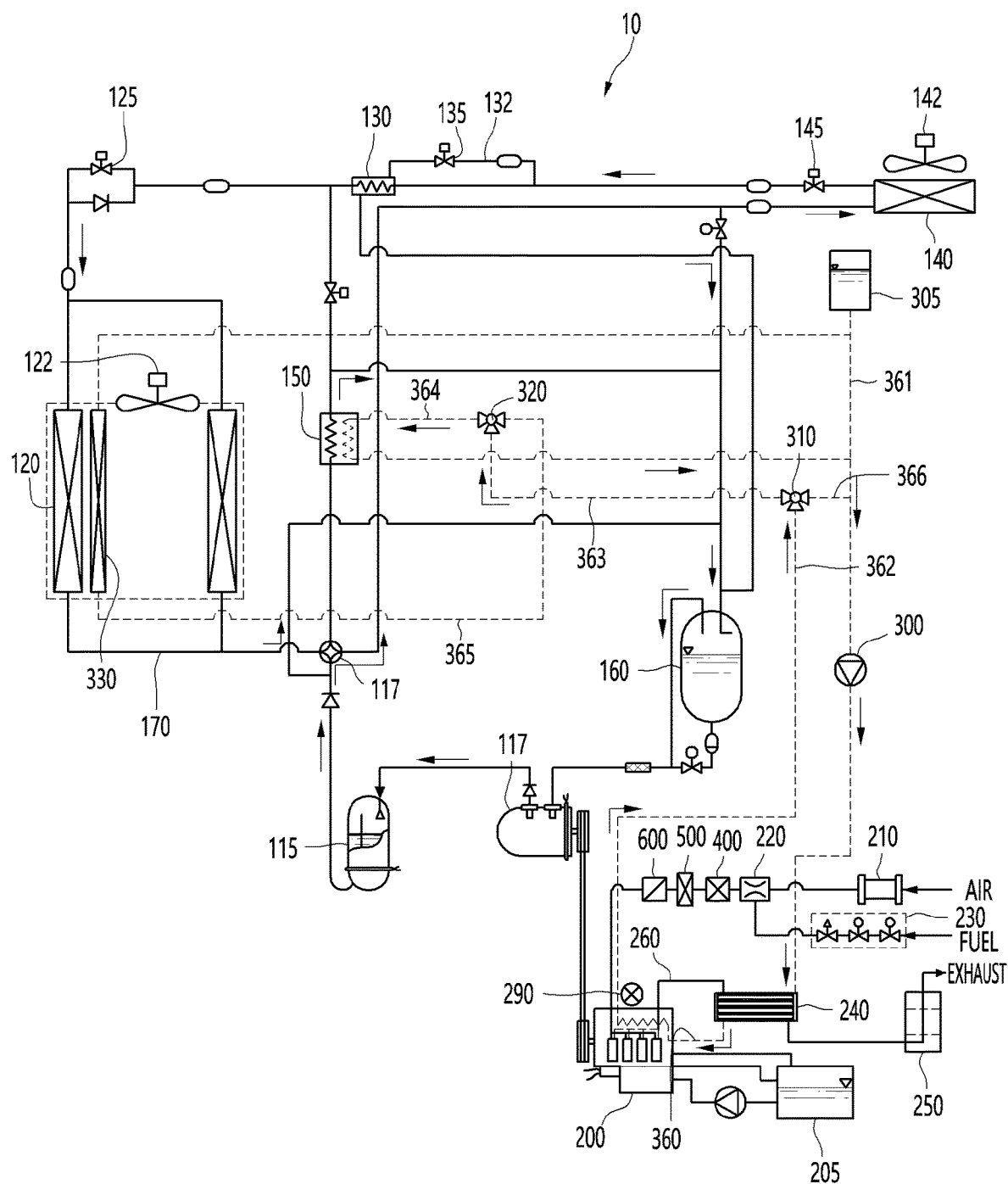
FIG. 2 is a cycle diagram showing the flow of refrigerant, cooling water, mixed fuel during heating operation of the gas heat pump system.

FIG. 2 is a cycle diagram showing the flow of refrigerant, cooling water, mixed fuel during heating operation of the gas heat pump system.

First, when the gas heat pump system 10 performs heating operation, refrigerant is decompressed in the main expansion device 125 after passing through the compressor 110, the oil separator 115, the four-way valve 117, the indoor heat exchanger 140 and the supercooling heat exchanger 130, is subjected to heat exchange in the outdoor heat exchanger 120, and then is introduced into the four-way valve 117 again. Here, the indoor heat exchanger 140 may function as a "condenser", and the outdoor heat exchanger 120 may function as an "evaporator".

The refrigerant which has passed through the four-way valve 117 may flow into the auxiliary heat exchanger 150, thereby exchanging heat with cooling water flowing through the fourth pipe 364. The refrigerant flowing into the auxiliary heat exchanger 150 is evaporative refrigerant having a high temperature and low pressure, and the cooling water supplied to the auxiliary heat exchanger 150 has a high temperature by heat of the engine 200. Accordingly, the refrigerant of the auxiliary heat exchanger 150 may absorb heat from the cooling water, thereby improving evaporation performance.

The refrigerant which has exchanged heat in the auxiliary heat exchanger 150 may be introduced into the gas-liquid separator 160 to be phase-separated and then be sucked into the compressor 110. The refrigerant may repeatedly flow in the cycle.

Meanwhile, when the cooling water pump 300 is driven, the cooling water discharged from the cooling water pump 300 is introduced into the exhaust gas heat exchanger 240 along the first pipe 361, thereby exchanging heat with exhaust gas. In addition, the cooling water discharged from the exhaust gas heat exchanger 240 flows into the engine 200 to cool the engine 200 and flows into the first flow changing unit 310 through the second pipe 362.

Under control of the first flow changing unit 310, the cooling water which has passed through the first flow changing unit 310 flows toward the second flow changing unit 320 along the third pipe 363. In addition, the cooling water which has passed through the second flow changing unit 320 may flow into the auxiliary heat exchanger 150 through the fourth pipe 364, thereby exchanging heat with refrigerant. In addition, the cooling water which has passed through the auxiliary heat exchanger 150 flows into the cooling water pump 300. The cooling water may repeatedly flow in such a cycle.

Meanwhile, during heating operation, flow of cooling water to the radiator 330 may be limited. In general, since heating operation is performed when an outdoor temperature is low, the cooling water is highly likely to be cooled when flowing through the cooling pipe 360, even if the cooling water is not cooled in the radiator 330. Accordingly, during heating operation, the first and second flow switching units 310 and 320 may be controlled such that the cooling water does not pass through the radiator 330.

However, when heat exchange in the auxiliary heat exchanger 150 is unnecessary, the cooling water may flow from the second flow changing unit 320 into the radiator 330 through the fifth pipe 365.

Driving of the engine 200 will be described.

Air filtered in the air filter 210 and fuel, the pressure of which is adjusted through the zero governor 230, are mixed in the mixer 220. The mixture obtained in the mixer 220 is pressurized in the supercharging unit 400 and the pressurized mixture is cooled in the intercooler 500, thereby improving density of the mixture. The amount of mixture which has passed through the intercooler 500 is adjusted through the adjusting unit 600, and the mixture is supplied to the engine 200 to operate the engine 200. In addition, the exhaust gas discharged from the engine 200 is introduced into the exhaust gas heat exchanger 240 to exchange heat with the cooling water and is discharged to the outside through the muffler 250.

Figure 3:
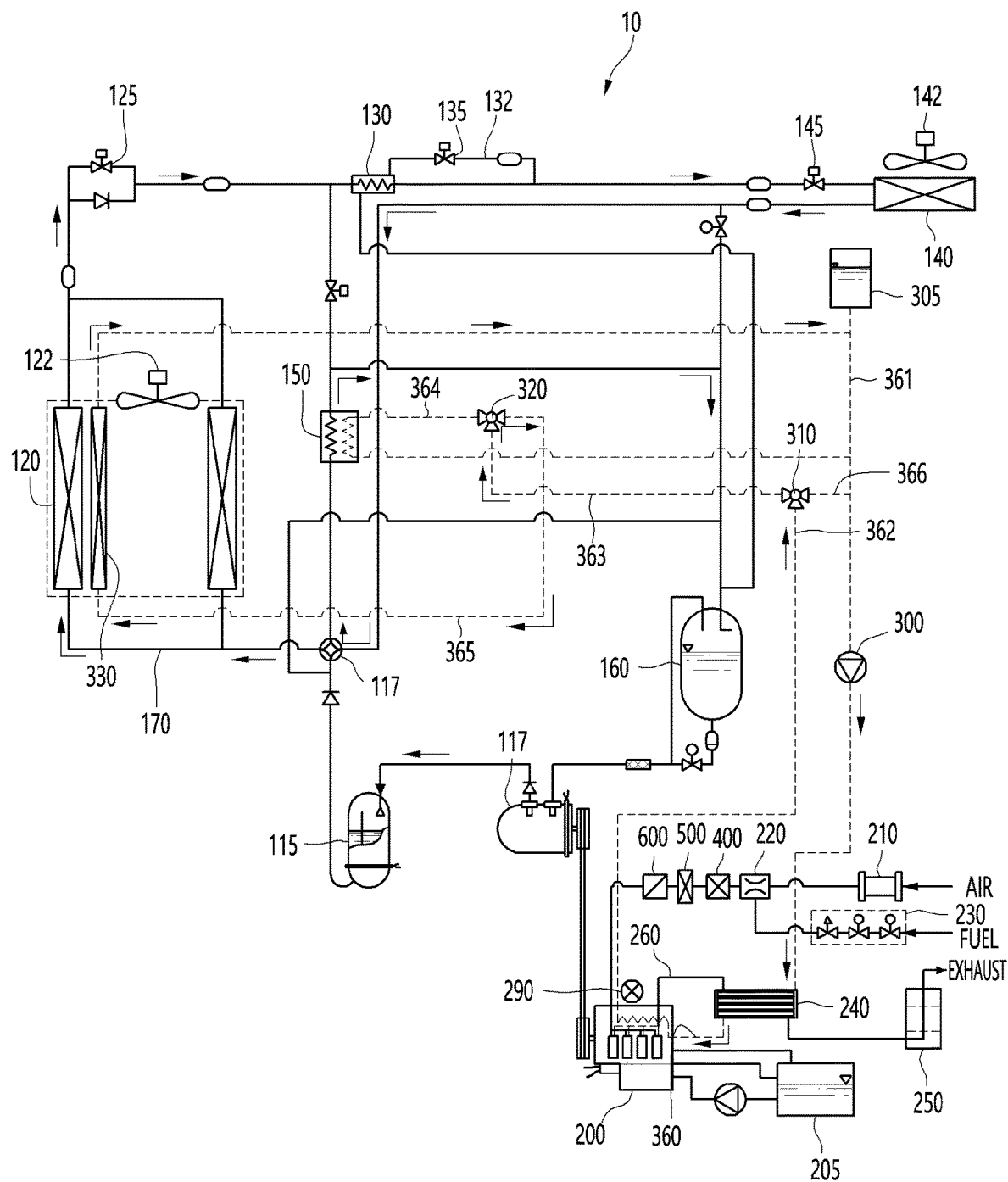
FIG. 3 is a cycle diagram showing the flow of refrigerant, cooling water, mixed fuel during cooling operation of the gas heat pump system.

FIG. 3 is a cycle diagram showing the flow of refrigerant, cooling water, mixed fuel during cooling operation of the gas heat pump system.

Meanwhile, when the gas heat pump system 10 performs cooling operation, the refrigerant is decompressed in the indoor expansion device 145 after passing through the compressor 110, the oil separator 115, the four-way valve 117, the outdoor heat exchanger 120 and the supercooling heat exchanger 130, is subjected to heat exchange in the indoor heat exchanger 140, and is introduced into the four-way valve 117 again. Here, the outdoor heat exchanger 120 may function as a "condenser" and the indoor heat exchanger 120 may function as an "evaporator".

The refrigerant which has passed through the four-way valve 117 may flow into the auxiliary heat exchanger 150 and exchange heat with the cooling water flowing through the cooling pipe 360. In addition, the refrigerant which has exchanged heat in the auxiliary heat exchanger 150 may be introduced into the gas-liquid separator 160 to be phase-separated and then sucked into the compressor 110. The refrigerant may repeatedly flow in the cycle.

Meanwhile, when the cooling water pump 300 is driven, the cooling water discharged from the cooling water pump 300 flows into the exhaust gas heat exchanger 240 and exchanges heat with exhaust gas. In addition, the cooling water discharged from the exhaust gas heat exchanger 240 flows into the engine 200 to cool the engine 200 and flows into the first flow changing unit 310. Flow of the cooling water until flowing into the first flow changing unit 310 is equal to flow of cooling water during heating operation.

The cooling water which has passed through the first flow changing unit 310 may flow into the second flow changing unit 320, and flow through the radiator 330 to exchange heat with outdoor air under control of the second flow changing unit 320. In addition, the cooling water cooled in the radiator 330 flows into the cooling water pump 300. The cooling may repeatedly flow in such a cycle.

Meanwhile, during cooling operation, flow of the cooling water to the auxiliary heat exchanger 150 may be limited. In general, since cooling operation is performed when an outdoor temperature is high, heat absorption of evaporative refrigerant for securing evaporation performance may not be required. Accordingly, during cooling operation, the first and second flow switching units 310 and 320 may be controlled such that cooling water does not pass through the auxiliary heat exchanger 150.

However, when heat exchange in the auxiliary heat exchanger 150 is necessary, cooling water may flow into the auxiliary heat exchanger 150 through the second flow changing unit 320.

For driving of the engine 200, the same operation as heating operation is performed and thus a detailed description thereof will be omitted.

FIGS. 4 to 7 are systematic diagrams showing various embodiments of an engine module as a component of the present disclosure.

Figure 4:
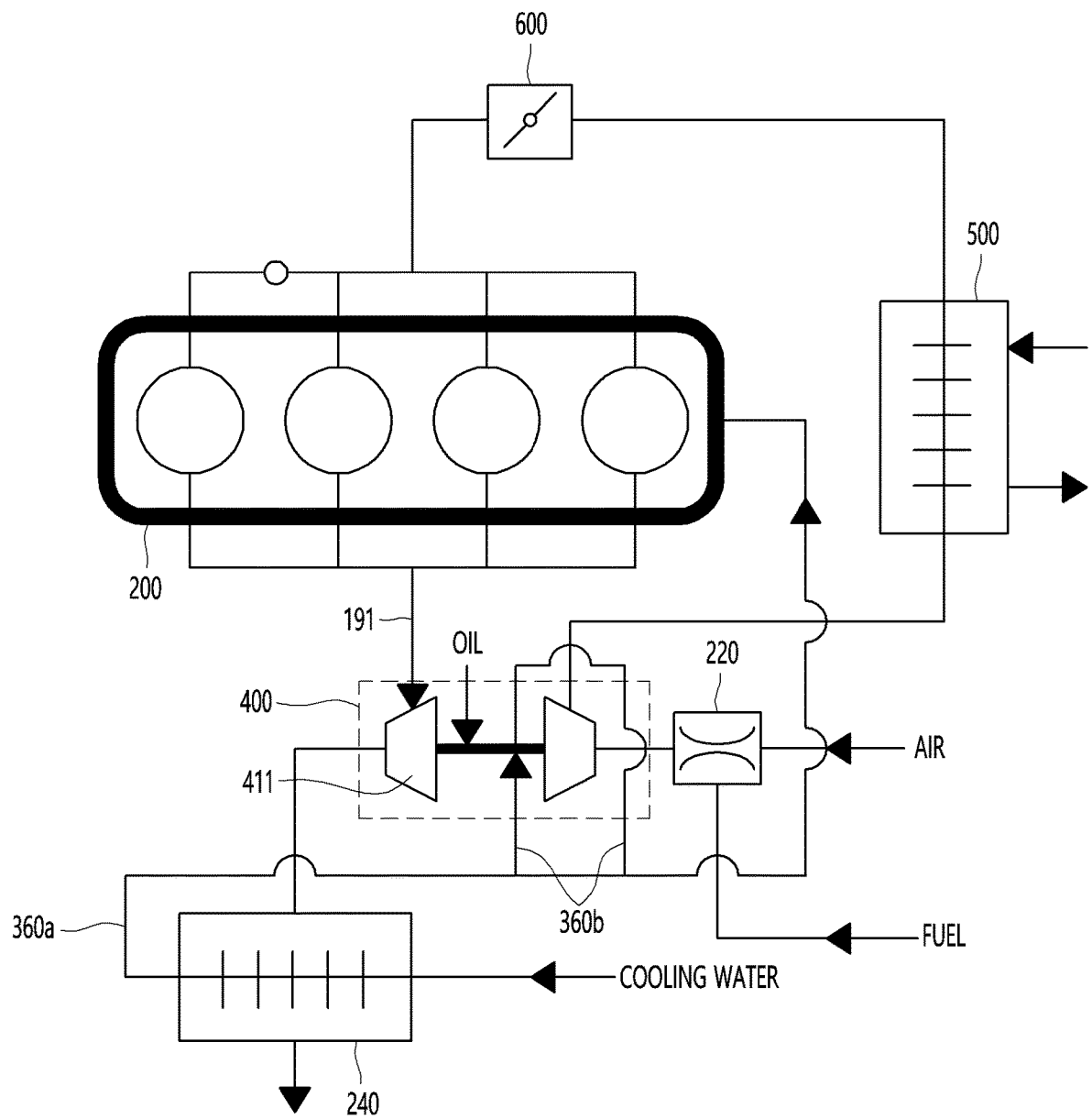
FIGS. 4 to 7 are systematic diagrams showing various embodiments of an engine module as a component of the present disclosure.

First, referring to FIG. 4, the supercharging unit 400 may be provided as a turbocharger.

The "turbocharger" rotates a turbine 411 using the exhaust gas discharged from the engine 200 and pressurizes (compresses) gas introduced by rotation force to discharge gas.

Accordingly, when the supercharging unit 400 is provided as a turbocharger, the turbine 411 of the turbocharger is connected to the exhaust manifold of the engine 200 through an exhaust gas pipe 191 and is rotated, and the mixture obtained in the mixer is introduced, is pressurized (compressed), and is discharged to the intercooler 500.

In addition, the rotation shaft of the turbocharger may receive oil from the engine 200, for the purpose of lubrication.

Meanwhile, as described above, when the supercharging unit 400 is a turbocharger, heat dissipation of the turbocharger is required. For example, the turbocharger may dissipate heat while exchanging heat with cooling water.

For heat dissipation of the turbocharger, the cooling water pipe 360 may include a first cooling water pipe 360a and a second cooling water pipe 360b.

Specifically, the first cooling water pipe 360a is disposed between the exhaust gas heat exchanger 240 and the engine 200 to guide the cooling water which has passed through the exhaust gas heat exchanger 240 to the engine 200.

As another example, the first cooling water pipe 360a may also include a cooling water pipe before passing through the exhaust gas heat exchanger 240. That is, the first cooling water pipe 360a may mean a cooling water pipe between the cooling water pipe 300 and the engine 200.

The second cooling water pipe 360b is branched from the first cooling water pipe 360a such that at least some of the cooling water flowing through the first cooling water pipe 360a exchanges heat with the supercharging unit 400. The cooling water introduced into the second cooling water pipe 360a flows to the engine 200 through the supercharging unit 400.

At this time, the second cooling water pipe 360b may be branched from the first cooling water pipe 360a before the supercharging unit 400 and combined with the first cooling water pipe 360a after passing through the supercharging unit 400, such that cooling water is supplied to the engine 200.

Figure 5:
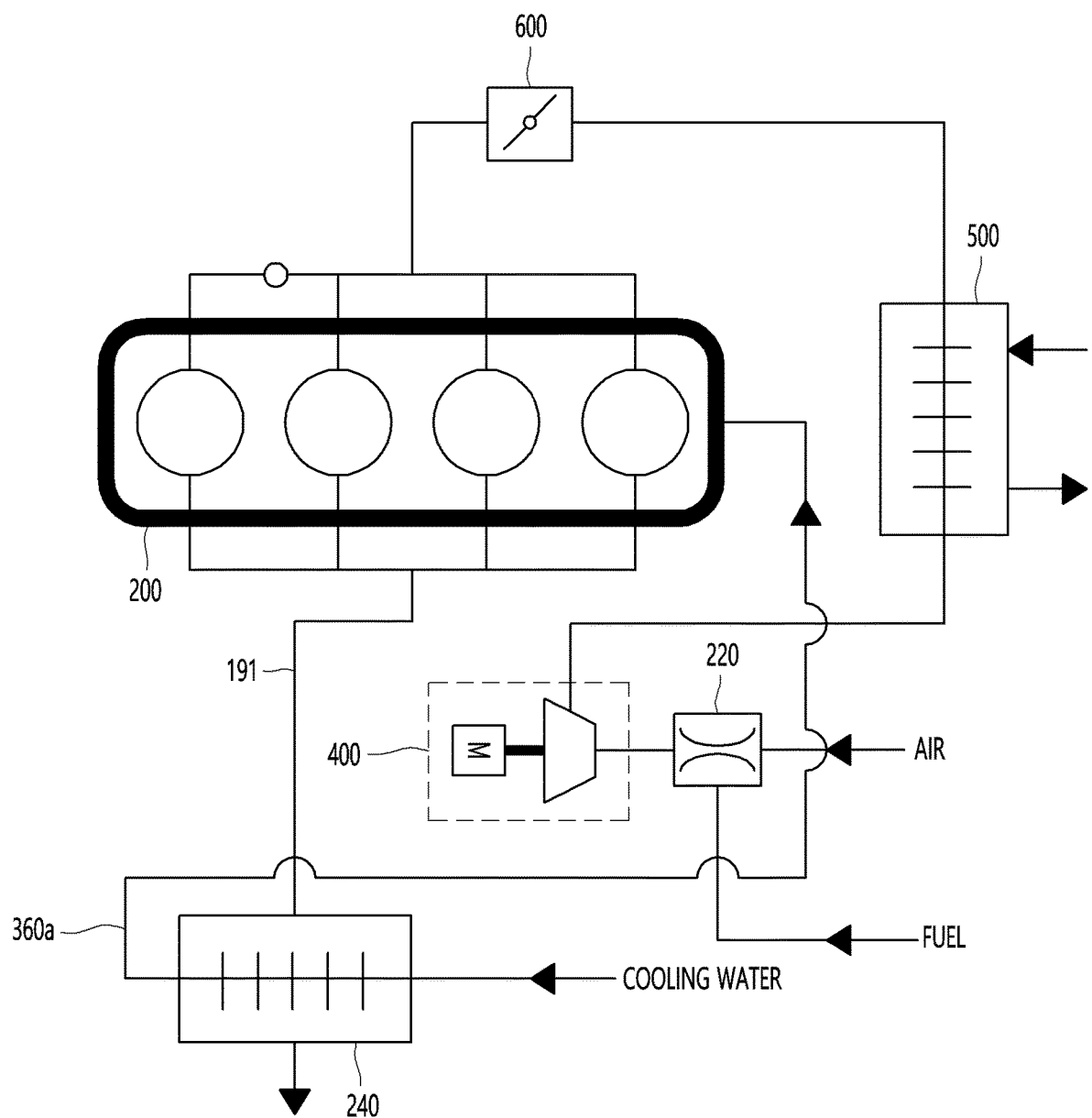

Meanwhile, referring to FIG. 5, the supercharging unit 400 may be provided as a supercharger.

The supercharger generates rotation force by power of the engine 200 or an electric motor, pressurizes (compresses) the introduced gas and discharges the gas. Accordingly, when the supercharging unit 400 is provided as a supercharger, the supercharger may pressurize (supercharge) the mixture obtained in the mixer using power of the engine 200 or the rotation force of the electric motor and discharge the mixture to the intercooler 500.

In general, the supercharger tends to stably operate in a low rotation region and cause output loss in a high rotation region. Accordingly, according to operation condition and required output condition of the engine, the supercharging unit 400 may be selectively used as a supercharger or a turbocharger.

Meanwhile, as described above, when the supercharging unit 400 is a supercharge, heat dissipation is not caused as in the turbocharger. Therefore, the cooling water pipe for cooling the supercharging unit 400 may not be further installed. Accordingly, the structure of the flow path is simplified, space utilization is improved and miniaturization is possible.

Figure 6:
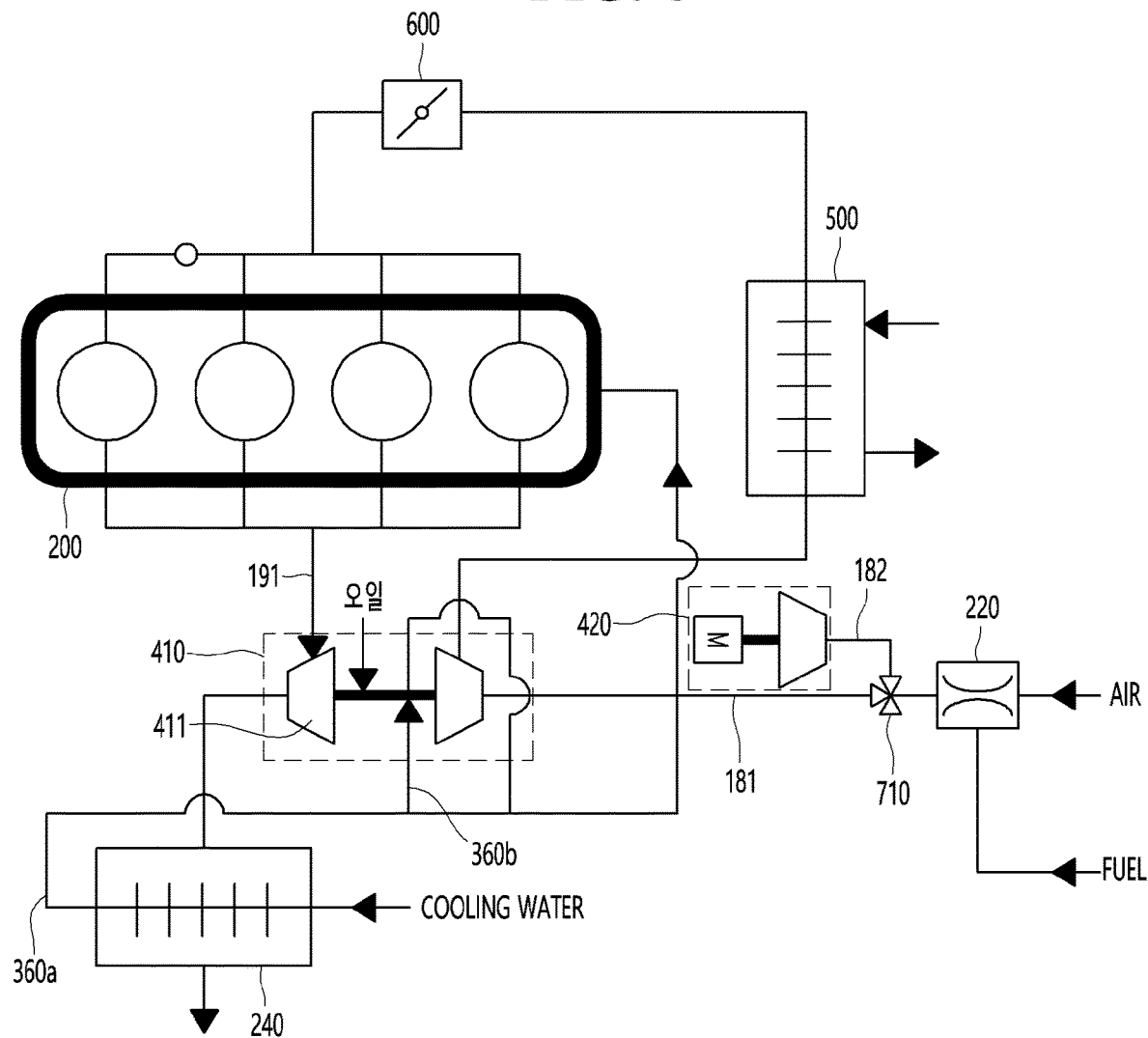
Figure 7:
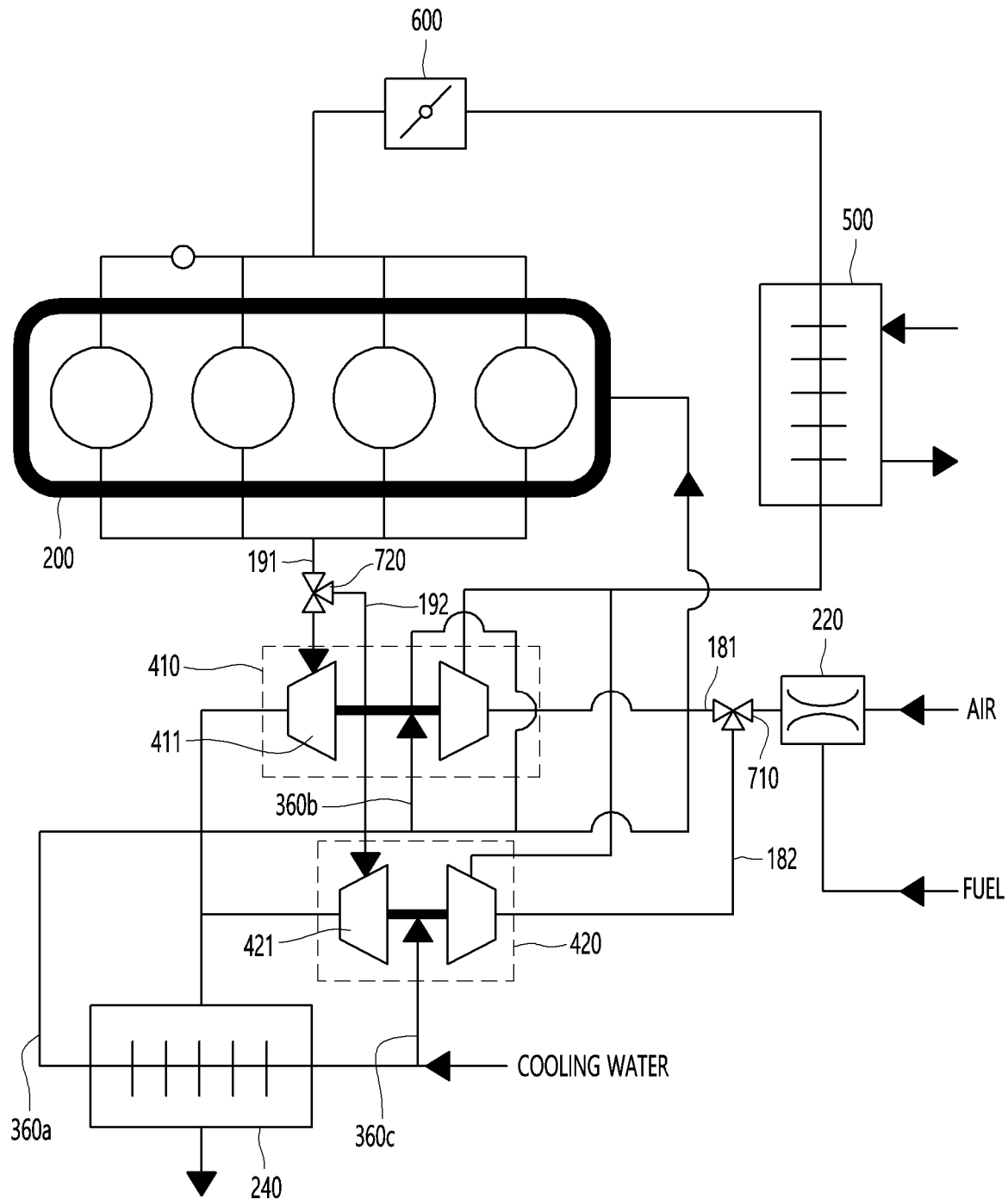

FIG. 6 is a view showing an embodiment in which a turbocharger and a supercharger are provided as supercharging units and are connected to each other in parallel. FIG. 7 is a view showing an embodiment in which two turbochargers are provided as supercharging units and are connected to each other in parallel.

Referring to FIGS. 6 to 7, a plurality of supercharging units 400 spaced apart from each other may be provided and, for example, a first supercharging unit 410 and a second supercharging unit 420 may be included.

When one supercharging unit 400 is disposed between the engine 200 and the mixer 220, a supercharging range may be limited by the maximum revolution count or compression capacity of the disposed supercharging unit 400, and, as a result, the output improvement range of the engine 200 may be limited.

In the present disclosure, the plurality of supercharging units 400 may be disposed such that the operation region of the supercharging unit 400 is widened and thus the output improvement range of the engine is further widened.

Although the supercharging unit 400 includes the first supercharging unit 410 and the second supercharging unit 420 in the following description, the present disclosure is not limited thereto and three or more supercharging units may be provided between the mixer 220 and the adjusting unit 600.

In addition, although the plurality of supercharging units 400 is connected in parallel and the mixture obtained in the mixer 220 is supplied to the engine 200 after flowing to the first supercharging unit 410 or the second supercharging unit 420, the first and second supercharging units 410 and 420 may be connected in series and thus the mixture obtained in the mixer 220 may be supplied to the engine 200 after sequentially passing through both the first supercharging unit 410 and the second supercharging unit 420.

In the first supercharging unit 410 and the second supercharging unit 420, compression capacity and the maximum revolution count of the turbine may be differently set.

Hereinafter, the flow process of the mixture and the flow process of the cooling water in different embodiments will be described with reference to FIGS. 6 and 7.

First, referring to FIG. 6, the first and second supercharging units 410 and 420 are provided as a turbocharger and a supercharger, respectively.

In addition, a first fuel pipe 181 for guiding the mixture obtained in the mixer 220 to the first supercharging unit 410 is provided between the mixer 220 and the first supercharging unit 410, and a second fuel pipe 182 for guiding the mixture to the second supercharging unit 420 is branched from the first fuel pipe 181.

In addition, a three-way valve 710 for maintaining the flow direction of the mixture discharged from the mixer 220 to the first fuel pipe 181 or changing the flow direction to the second fuel pipe 182 may be installed in an intersection between the first fuel pipe 181 and the second fuel pipe 182.

The mixture which has passed through the first supercharging unit 410 or the mixture which has passed through the second supercharging unit 420 flow into the intercooler 500.

In the present embodiment, the first supercharging unit 410 is a turbocharger and the second supercharging unit 420 is a supercharger.

In general, in the case of the turbocharger, since the turbine rotates using the exhaust gas of the engine 200, the turbocharger is advantageous in a high rotation region and a "turbo lag" phenomenon in which output is instantaneously delayed occurs in a low rotation region.

In contrast, the supercharger may work well at a low revolution count, but output loss may occur in a high rotation region.

The three-way valve 710 may enable the mixture to flow to the first supercharging unit 410 which is a turbocharger in the case of a high-rotation operation region (when the flow rate of exhaust gas is sufficient to rotate the turbine) and enable the mixture to flow to the second supercharging unit 420 which is a supercharger such that the mixture is smoothly pressurized regardless of the rotation speed in the case of a low-rotation operation region (when the flow rate of exhaust gas is insufficient to rotate the turbine).

At this time, the three-way valve 710 may be set to basically supply the mixture to the first supercharging unit 410 which is the turbocharger, and temporarily supply the mixture to the second supercharging unit 420 which is the supercharger only in a low rotation region (until the flow rate of exhaust gas for driving the turbocharger is output).

That is, the second supercharging unit 420 which is the supercharger may be understood as the supporter of the first supercharging unit 410 which is the turbocharger.

Meanwhile, referring to FIG. 7, both the first and second supercharging units 410 and 420 are provided as turbochargers.

The turbines 411 and 421 of the first and second supercharging units 410 and 420 receive the exhaust gas of the engine 200 to generate rotation force.

To this end, a first exhaust gas pipe 191 for guiding the exhaust gas discharged from the engine 200 to the first supercharging unit 410 is provided between the engine 200 and the first supercharging unit 410, and a second exhaust gas pipe 192 for guiding the exhaust gas to the second supercharging unit 420 is branched from the first exhaust gas pipe 191.

In addition, a three-way valve 720 for maintaining the flow direction of the exhaust gas discharged from the exhaust manifold of the engine 200 to the first exhaust gas pipe 191 or changing the flow direction to the second exhaust gas pipe 192 may be installed in an intersection between the first exhaust gas pipe 191 and the second exhaust gas pipe 192.

At this time, the first and second supercharging units 410 and 420 may be provided as turbochargers having different turbine capacities. In this case, supercharging is possible in a wider region than the case where one supercharging unit is installed.

For example, the capacity Q1 of the turbine 411 provided in the first supercharging unit 410 may be greater than the capacity Q2 of the turbine 421 provided in the second supercharging unit 420 (Q1>Q2).

Accordingly, the three-way valve 710 may enable the mixture to flow to the first supercharging unit 410 having the turbine 411 having a large capacity when output of the engine 200 having greater than a predetermined reference value needs to be improved and enable the mixture to flow to the second supercharging unit 420 having the turbine 421 having a small capacity when output of the engine 200 having less than the predetermined reference value needs to be improved, thereby performing supercharging in a wider region.

At this time, the three-way valves 710 and 720 may be interlocked with each other.

First, when the mixture flows to the first supercharging unit 410, the three-way valves 710 and 720 may be open toward only the first supercharging unit 410 and closed toward the second supercharging unit 420.

In contrast, when the mixture flows to the second supercharging unit 420, the three-way valves 710 and 720 may be open toward the second supercharging unit 420 and closed toward the first supercharging unit 410.

In addition, as described above, when both the first supercharging unit 410 and the second supercharging unit 420 are turbochargers, flow of the cooling water for cooling the first supercharging unit 410 and the second supercharging unit 420 is necessary.

To this end, the cooling water pipe 360 may include the first cooling water pipe 360a, the second cooling water pipe 360b and a third cooling water pipe 360c.

Specifically, the first cooling water pipe 360a is disposed between the exhaust gas heat exchanger 240 and the engine 200 to guide the cooling water which has passed through the exhaust gas heat exchanger 240 toward the engine 200.

The second cooling water pipe 360b is branched from the first cooling water pipe 360a such that at least some of the cooling water flowing through the first cooling water pipe 360a exchanges heat with the first supercharging unit 410. The cooling water introduced into the second cooling water pipe 360a may flow to the engine 200 through the first supercharging unit 410.

At this time, the second cooling water pipe 360b may be branched from the first cooling water pipe 360a before the first supercharging unit 410, and combined with the first cooling water pipe 360a after passing through the first supercharging unit 410, such that cooling water is supplied to the engine 200.

Meanwhile, the third cooling water pipe 360c may be branched from the cooling water pipe 360 before the exhaust gas heat exchanger 240 to supply cooling water to the second supercharging unit 420.

In addition, the third cooling water pipe 360c may be branched from the first cooling water pipe 360a such that at least some of the cooling water flowing through the first cooling water pipe 360a exchanges heat with the second supercharging unit 420. At this time, the cooling water introduced into the third cooling water pipe 360c flows to the engine 200 through the second supercharging unit 420.

At this time, the third cooling water pipe 360c may be branched from the first cooling water pipe 360a before the second supercharging unit 420 and combined with the first cooling water pipe 360a after passing through the second supercharging unit 420, such that cooling water is supplied to the engine 200.

In addition, valves (not shown) may be installed in the second cooling water pipe 360b and the third cooling water pipe 360c.

Accordingly, when the mixture flows to the first supercharging unit 410, the valve of the third cooling water pipe 360c is closed and the valve of the second cooling water pipe 360b is opened, such that the cooling water flows to only the second cooling water pipe 360b.

In contrast, when the mixture flows to the second supercharging unit 420, the valve of the third cooling water pipe 360c is opened and the valve of the second cooling water pipe 360b may be closed, such that the cooling water flows to only the third cooling water pipe 360c.

The invention claimed is:

1. A gas heat pump system comprising:
an air conditioning module including a compressor, an outdoor heat exchanger, an expansion device, an indoor heat exchanger and a refrigerant pipe;
an engine module including an engine configured to burn a mixture of fuel and air and provide power for operation of the compressor; and
a cooling module including a cooling water pump configured to generate flow of cooling water for cooling the engine and a cooling water pipe connected to the cooling water pump to guide flow of cooling water,
wherein the engine module includes:
a mixer configured to discharge the mixture of air and fuel to the engine;
a supercharger disposed between the mixer and the engine to compress the mixture discharged from the mixer and discharge the mixture to the engine; and
an adjuster disposed between the supercharger and the engine to adjust an amount of compressed mixture supplied to the engine,
wherein the cooling water pipe includes:
a first cooling water pipe configured to guide the cooling water discharged from the cooling water pump to the engine; and
a second cooling water pipe branched from the first cooling water pipe and passing through the supercharger, such that heat is exchanged between at least some cooling water and the supercharger.

2. The gas heat pump system of claim 1, wherein an intercooler configured to cool the compressed mixture discharged from the supercharger to improve density is provided between the supercharger and the adjuster.

3. The gas heat pump system of claim 1, wherein the supercharger is provided as a turbocharger driven by exhaust gas of the engine.

4. The gas heat pump system of claim 1, wherein the supercharger is provided as a supercharger driven by power of the engine or an electric motor.

5. The gas heat pump system of claim 1, wherein an exhaust gas heat exchanger, into which exhaust gas discharged from the engine flows, is provided on the first cooling water pipe, and the cooling water flows to the engine after passing through the exhaust gas heat exchanger.

6. The gas heat pump system of claim 1, wherein the second cooling water pipe is branched from the first cooling water pipe before the supercharger and combined with the first cooling water pipe after passing through the supercharger.

7. The gas heat pump system of claim 1, wherein the supercharger includes a first supercharger and a second supercharger spaced apart from each other.

8. The gas heat pump system of claim 7, wherein the first supercharger and the second supercharger are different in view of compression capacity or maximum turbine revolution count of a turbine.

9. The gas heat pump system of claim 7, wherein the first supercharger and the second supercharger are connected to each other in series.

10. The gas heat pump system of claim 7, wherein the first supercharger and the second supercharger are connected to each other in parallel.

11. The gas heat pump system of claim 7, further comprising:
a first fuel pipe provided between the mixer and the first supercharger to guide the mixture obtained in the mixer to the first supercharger;
a second fuel pipe branched from the first fuel pipe to guide the mixture to the second supercharger; and
a three-way valve installed at an intersection between the first fuel pipe and the second fuel pipe to maintain a flow direction of the mixture discharged from the mixer to the first fuel pipe or change the flow direction to the second fuel pipe.

12. The gas heat pump system of claim 11, wherein the first supercharger is a turbocharger driven by exhaust gas of the engine and the second supercharger is a supercharger driven by power of the engine or an electric motor.

13. The gas heat pump system of claim 11, wherein the first supercharger and the second supercharger are turbochargers driven by exhaust gas of the engine.

14. The gas heat pump system of claim 13, further comprising:
a first exhaust gas pipe provided between the engine and the first supercharger to guide exhaust gas discharged from the engine to the first supercharger;
a second exhaust gas pipe branched from the first exhaust gas pipe to guide exhaust gas to the second supercharger; and
a three-way valve installed at an intersection between the first exhaust gas pipe and the second exhaust gas pipe to maintain a flow direction of the exhaust gas discharged from the engine to the first exhaust gas pipe or change the flow direction to the second exhaust gas pipe.

15. The gas heat pump system of claim 1, wherein the fuel is liquefied natural gas (LNG) or liquefied petroleum gas (LPG) for household.

16. The gas heat pump system of claim 1, wherein the engine module operates the engine in a state of closing the adjuster, immediately before operation of the engine is stopped.

* * * * *